United States Patent
Cai et al.

(10) Patent No.: US 9,525,662 B2
(45) Date of Patent: Dec. 20, 2016

(54) AUTOMATIC ASSIGNMENT OF INTERNET PROTOCOL ADDRESSES IN A RING NETWORK

(71) Applicants: Dezhong Cai, San Jose, CA (US); Yongkui Han, Westford, MA (US)

(72) Inventors: Dezhong Cai, San Jose, CA (US); Yongkui Han, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 434 days.

(21) Appl. No.: 13/867,234

(22) Filed: Apr. 22, 2013

(65) Prior Publication Data

US 2014/0314081 A1   Oct. 23, 2014

(51) Int. Cl.
*H04L 29/12* (2006.01)
*H04L 12/42* (2006.01)
*H04L 12/741* (2013.01)

(52) U.S. Cl.
CPC ............ *H04L 61/6068* (2013.01); *H04L 12/42* (2013.01); *H04L 61/2007* (2013.01); *H04L 45/74* (2013.01)

(58) Field of Classification Search
CPC ................. H04L 12/42–12/4637; H04L 45/18; H04L 45/74; H04L 61/2007; H04L 61/6068
See application file for complete search history.

(56) References Cited

U.S. PATENT DOCUMENTS

| | | | |
|---|---|---|---|
| 7,568,040 B2 | 7/2009 | Townsley et al. | |
| 8,078,721 B2 | 12/2011 | Droms et al. | |
| 2006/0129676 A1* | 6/2006 | Modi | H04L 29/12009 709/227 |
| 2008/0043749 A1* | 2/2008 | Suganthi et al. | 370/395.52 |
| 2009/0154476 A1* | 6/2009 | Kobara | H04L 29/12254 370/400 |
| 2009/0290486 A1* | 11/2009 | Wang | H04L 12/437 370/222 |
| 2013/0287028 A1* | 10/2013 | Ashwood-Smith | H04L 45/74 370/392 |
| 2015/0074277 A1* | 3/2015 | Shigeeda | 709/226 |

OTHER PUBLICATIONS

R. Droms, "Dynamic Host Configuration Protocol," RFC 2131, The Internet Society, Reston, VA, USA, Mar. 1997 (forty-five pages).
Cheshire et al., "Dynamic Configuration of IPv4 Link-Local Addresses," RFC 3927, The Internet Society, Reston, VA, USA, May 2005 (thirty-three pages).
"Configuring the Satellite Network Virtualization (nV) System on the Cisco ASR 9000 Series Router," Cisco Systems, Inc., San Jose, CA, USA, Copyright 2010-2012 (twenty-six pages).

* cited by examiner

*Primary Examiner* — Marcus R Smith
(74) *Attorney, Agent, or Firm* — The Law Office of Kirk D. Williams

(57) ABSTRACT

In one embodiment, a negotiation is performed between each adjacent pair of a plurality of packet switching devices in a ring network to determine an Internet Protocol (IP) subnet to be used for communicating between said packet switching devices of said adjacent pair. Packets are communicated by said packet switching devices of said adjacent pair using a different IP address of said determined IP subnet. In one embodiment, each of the plurality of packet switching devices is initially assigned an IP subnet to use on one of its two interfaces participating in the ring network; and wherein said negotiation determines which of said two interfaces will use said initially assigned IP subnet.

9 Claims, 7 Drawing Sheets

NEGOTIATING TLV

AUTOMATIC ASSIGNMENT OF INTERNET PROTOCOL ADDRESSES IN A RING NETWORK

TECHNICAL FIELD

The present disclosure relates generally to forwarding packets in a communications network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

A ring network is a network topology in which each network node connects to exactly two other nodes, forming a single continuous pathway for signals through each node. Data travels from node to node, with each node along the way handling every packet.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
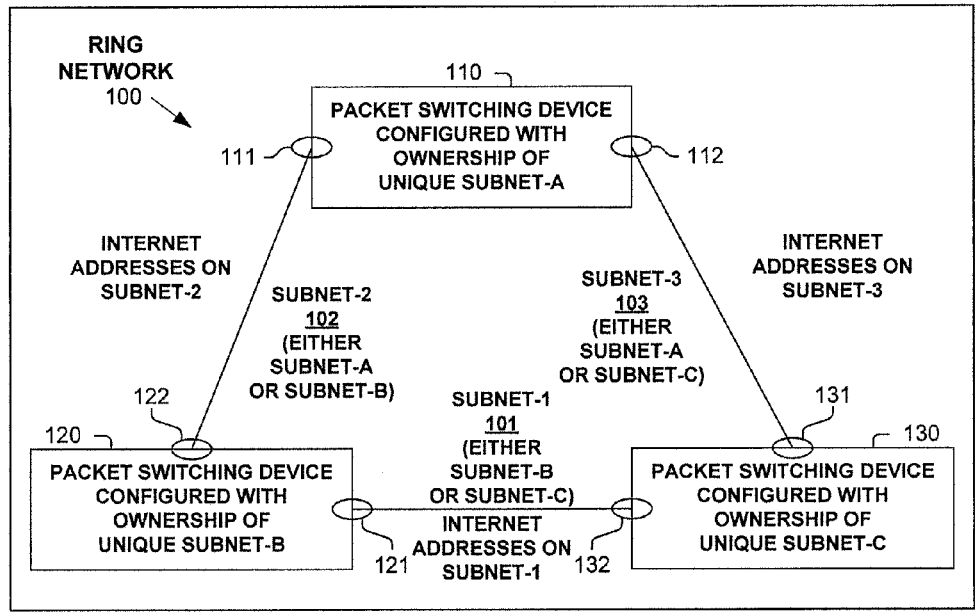
FIG. 1 illustrates a network operating according to one embodiment.

Disclosed are, inter alia, methods, apparatus, computer-storage media, mechanisms, and means associated with automatic assignment of Internet Protocol addresses in a ring network. One embodiment includes negotiating between each adjacent pair of a plurality of packet switching devices in a ring network to determine an Internet Protocol (IP) subnet to be used for communicating between said packet switching devices of said adjacent pair. Packets are communicated by said packet switching devices of said adjacent pair using a different IP address of said determined IP subnet. In one embodiment, each of the plurality of packet switching devices is initially assigned an IP subnet to use on one of its two interfaces participating in the ring network; and wherein said negotiation determines which of said two interfaces will use said initially assigned IP subnet.

2. Description

Disclosed are, inter alia, methods, apparatus, computer-storage media, mechanisms, and means associated with automatic assignment of Internet Protocol addresses in a ring network. In one embodiment, the ring network is a closed-ring network. In one embodiment, the ring network is an open ring network (e.g., each of the two end nodes has a single interface participating in the ring network). in one embodiment, the ring network is a single ring network. In one embodiment, the ring network is a cascaded ring network.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing said read value—the value is obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment includes, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Disclosed are, inter alia, methods, apparatus, computer-storage media, mechanisms, and means associated with automatic assignment of Internet Protocol addresses in a ring network. In one embodiment, the ring network is a closed-ring network. In one embodiment, the ring network is an open ring network (e.g., each of the two end nodes has a single interface participating in the ring network). in one embodiment, the ring network is a single ring network. In one embodiment, the ring network is a cascaded ring network.

One embodiment includes a method, comprising: negotiating between each adjacent pair of a plurality of packet switching devices in a ring network to determine an Internet Protocol (IP) subnet to be used for communicating between said packet switching devices of said adjacent pair; and communicating packets by said packet switching devices of said adjacent pair using a different IP address of said determined IP subnet.

In one embodiment, the plurality of packet switching devices consists of n packet switching devices, there are n said adjacent pairs of packet switching devices in the ring network, each of the n packet switching devices is assigned a different IP subnet to use for an undetermined one of its interfaces prior to said negotiation operation; and wherein said negotiation results in each said IP subnet in the ring network to be assigned a different one of said n different IP subnets.

In one embodiment, each device of said adjacent pair of the plurality of packet switching devices is associated with a current priority which is used in said determining which of the two assigned different IP subnets to use for the IP subnet between said adjacent pair of the plurality of packet switching devices. In one embodiment, each of the plurality of packet switching devices is initially assigned an IP subnet to use on one of its two interfaces participating in the ring network; and wherein said negotiation determines which of said two interfaces will use said initially assigned IP subnet. One embodiment includes receiving said initially assigned IP subnet from an operator interface. One embodiment includes receiving said initially assigned IP subnet from an external device.

In one embodiment, each device of said adjacent pair of the plurality of packet switching devices is assigned a different IP subnet; and wherein said determined IP subnet is one of these two different IP subnets. In one embodiment, each device of said adjacent pair of the plurality of packet switching devices is associated with a current priority value; and wherein said determining which of the two assigned different IP subnets to use for the IP subnet between said adjacent pair of the plurality of packet switching devices is determined based on the relative priority of these two current priority values. In one embodiment, said negotiating includes communicating from each particular device to the other device of said adjacent pair of a plurality of packet switching devices the different IP subnet and the current priority value of said particular device. In one embodiment, said negotiating includes communicating from each particular device to the other device of said adjacent pair of a plurality of packet switching devices the different IP subnet.

In one embodiment, each of the plurality of packet switching devices is initially assigned an IP subnet to use on one of its two interfaces participating in the ring network; and wherein said negotiation determines which of said two interfaces will use said initially assigned IP subnet. In one embodiment, each device of said adjacent pair of the plurality of packet switching devices is assigned a different IP subnet; and wherein said determined IP subnet is one of these two different IP subnets. In one embodiment, each device of said adjacent pair of the plurality of packet switching devices is associated with a current priority value; and wherein said determining which of the two assigned different IP subnets to use for the IP subnet between said adjacent pair of the plurality of packet switching devices is determined based on the relative priority of these two current priority values. In one embodiment, said negotiating includes communicating from each particular device to the other device of said adjacent pair of a plurality of packet switching devices the different IP subnet and the current priority value of said particular device. In one embodiment, said negotiating includes communicating from each particular device to the other device of said adjacent pair of a plurality of packet switching devices the different IP subnet.

In one embodiment, each said adjacent pair of the plurality of packet switching devices in the ring network communicates over a point-to-point link; and wherein each of the IP subnets use thirty-one bit prefixes.

One embodiment includes a method, comprising: sending, by the particular ring network node to a first adjacent node in the ring network, a request to use the first Internet Protocol (IP) subnet for communicating between the particular ring network node and the first adjacent node and a first priority value associated with the first IP subnet; receiving, by the particular ring network node, a request from the first adjacent node to use a second IP subnet for communicating between the particular ring network node and the first adjacent node and a second priority value associated with the second IP subnet; and determining, by the particular ring network node, to use the first or second IP subnet based on first and second priority values.

One embodiment includes: communicating packets, by the particular ring network node with the first adjacent node, using the second IP subnet; sending, by the particular ring network node to a second adjacent node in the ring network, a request to use the first IP subnet for communicating between the particular ring network node and the second adjacent node; and communicating packets, by the particular ring network node with the second adjacent node, using the second IP subnet. One embodiment includes: assigning to the particular ring network node the first IP subnet to use in communicating in the ring network; and assigning to the first adjacent node the second IP subnet to use in communicating in the ring network.

One embodiment includes an apparatus, comprising: one or more processing elements; memory; a first interface configured to communicate packets with a first adjacent node in a ring network, including communicating first Internet Protocol (IP) subnet negotiation information; and a second interface configured to communicate packets with a second adjacent node in the ring network, including communicating second IP subnet negotiation information; wherein the apparatus is configured to use a particular IP subnet in communicating with the first or second adjacent node in the ring network; and wherein said one or more processing elements are configured to perform operations, including: determining to use the particular IP subnet for communicating with which node of the first and second adjacent nodes, and in response, to configure the respective first or second interface to use an address on the particular IP subnet.

Expressly turning to the figures, FIG. 1 illustrates ring network 100 operating according to one embodiment. As shown, ring network 100 includes three packet switching devices 110, 120, and 130 (of course, a ring network can have more devices). Packet switching device 110 is configured with ownership of subnet-A; packet switching device 120 is configured with ownership of subnet-B; and packet switching device 130 is configured with ownership of subnet-C. Each of subnets A, B and C are unique in ring network 100. This configuration of packet switching devices 110, 120, 130 may be done locally or remotely, and configured a priori or at runtime.

In one embodiment, when a packet switching device (110, 120, 130) owns a particular subnet and is participating in a ring network (100), one of the two interfaces (111, 112, 121, 122, 131, 132) of the packet switching device will use the particular subnet; and the packet switching device will receive the subnet to use for the other interface from an adjacent neighbor. Therefore, as shown in FIG. 1, subnet-1 (101) will either be subnet-B (from packet switching device 120) or subnet-C (from packet switching device 130); subnet-2 (102) will either be subnet-B (from packet switching device 120) or subnet-A (from packet switching device 110); and subnet-3 (103) will either be subnet-A (from packet switching device 110) or subnet-C (from packet switching device 130).

Figure 2A:
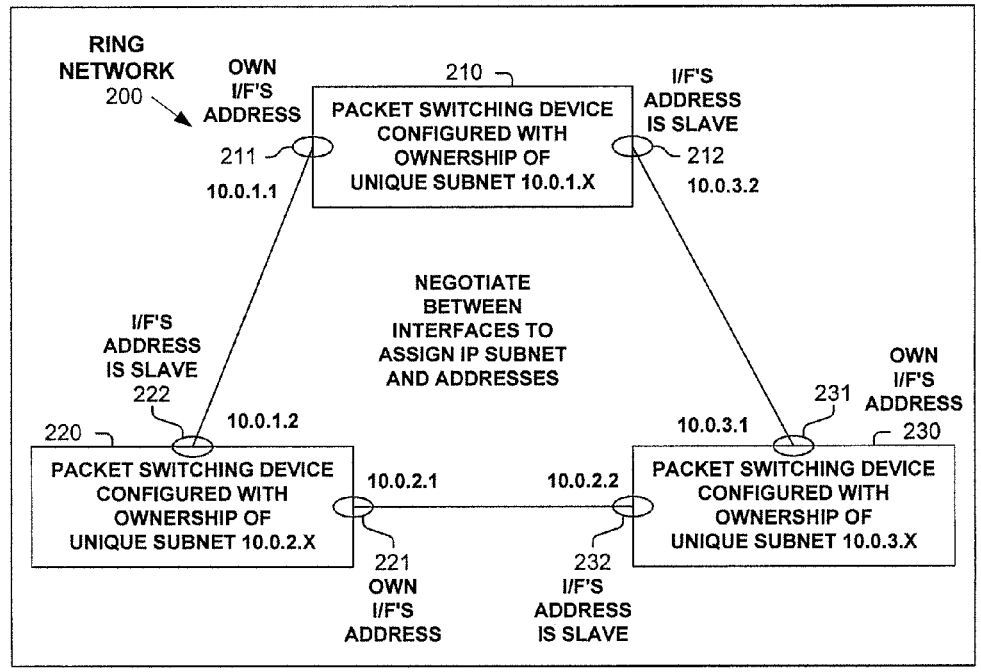
FIG. 2A illustrates a network operating according to one embodiment.

FIG. 2A illustrates ring network 200 operating according to one embodiment. Ring network 200 includes packet switching devices 210, 220 and 230, wherein the configured (e.g., assigned) subnets have been assigned to interfaces (211, 212, 221, 222, 231, 232) as shown. In one embodiment, one of the packet switching devices (210, 220, 230) is seeded with a high priority ownership value for one of its two interfaces (211, 212, 221, 222, 231, 232), and this high priority value determines for ring network 200 whether the owned addresses will be assigned clockwise or counterclockwise among interconnecting point-to-point networks between packet switching devices (210, 220, 230) as shown in FIG. 2A. The configuration resulting from the negotiations is illustrated in FIG. 2A using /24 subnets (while one embodiment uses a different one of the different subnet lengths). In one embodiment, /31 subnets; hence, the address of one end of the point-to-point link ends in a one, and the address on the other end of the point-to-point link ends in a zero. In one embodiment, the address ending in a one signifies that device owns the subnet; while in one embodiment, the address ending in a zero signifies that device owns the subnet.

Figure 2B:
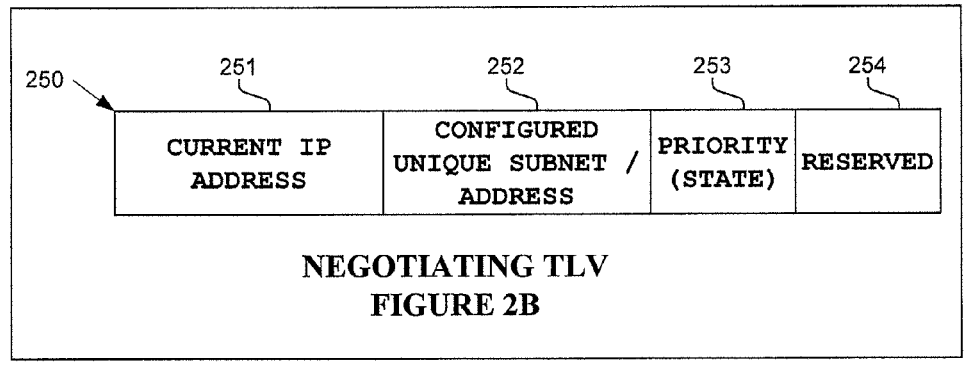
FIG. 2B illustrates a packet format used in one embodiment.

In one embodiment, packet switching devices (210, 220, 230) communicate with each other using Link Layer Discovery Protocol (LLDP). FIG. 2B illustrates a vendor type-length-value (TLV) extension 250 of LLDP protocol used in one embodiment in automatically assigning Internet Protocol (IP) addresses in a ring network. In one embodiment, TLV extension 250 includes four fields: current IP address field 251 used for communicating the currently assigned IP address to the sending interface; configured unique subnet (or address including the subnet) field 252 for communicating the sending packet switching device's owned subnet; priority/state field 253 for communicating the priority/state of the sending interface; and reserved field 254.

One embodiment uses three different priority values (e.g., states of the interface). In one embodiment, a priority of zero defines the interface as the non-owner/slave interface (e.g., the subnet value will be that owned by the adjacent packet switching device in the ring network from that interface); a priority of one defines the interface as not yet determined to be the owner or slave; and a priority of two defines the interface as the owned interface and will use the subnet assigned to the packet switching device. In one embodiment, the interface address on the subnet is defined based on whether the interface is an owner or slave interface. In one embodiment (e.g., using a \31 subnet), an owned interface will end in a one and a slave interface will in a zero. In one embodiment (e.g., using a \31 subnet), an owned interface will end in a zero and a slave interface will in a one. Hence, the IP address of an interface is deterministically determined based on whether or not the negotiation with its adjacent packet switching device determines the interface to be an owned or slave interface.

Figure 3A:
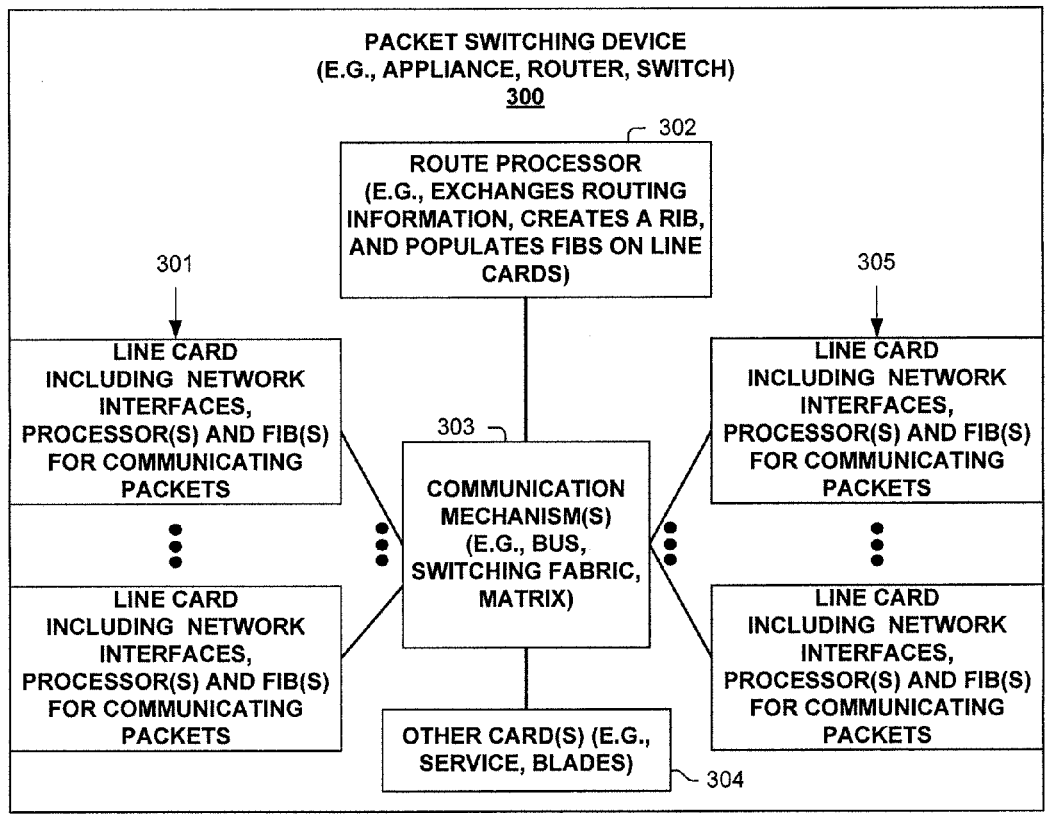
FIG. 3A illustrates a packet switching device according to one embodiment.

One embodiment of a packet switching device 300 is illustrated in FIG. 3A. As shown, packet switching device 300 includes multiple line cards 301 and 305, each with one or more network interfaces for sending and receiving packets over communications links (e.g., in a ring network after negotiating with adjacent packet switching device(s) as to which IP address to use on a corresponding interface), and with one or more processing elements that are used in one embodiment associated with automatic assignment of Internet Protocol addresses in a ring network. Packet switching device 300 also has a control plane with one or more processing elements 302 for managing the control plane and/or control plane processing of packets associated with automatic assignment of Internet Protocol addresses in a ring network. Packet switching device 300 also includes other cards 304 (e.g., service cards, blades) which include processing elements that are used in one embodiment to process packets associated with automatic assignment of Internet Protocol addresses in a ring network, and some communication mechanism 303 (e.g., bus, switching fabric, matrix) for allowing its different entities 301, 302, 304 and 305 to communicate.

Figure 3B:
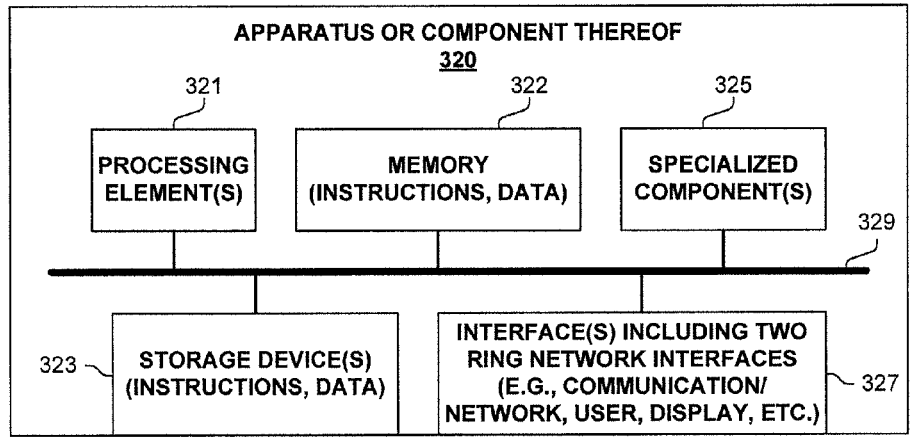
FIG. 3B illustrates an apparatus according to one embodiment.

FIG. 3B is a block diagram of an apparatus 320 used in one embodiment associated with automatic assignment of Internet Protocol addresses in a ring network. In one embodiment, apparatus 320 performs one or more processes, or portions thereof, corresponding to one of the flow, network, or other diagrams illustrated or otherwise described herein, and/or illustrated in another diagram or otherwise described herein.

In one embodiment, apparatus 320 includes one or more processing element(s) 321, memory 322, storage device(s) 323, specialized component(s) 325 (e.g. optimized hardware such as for performing lookup and/or packet processing operations, etc.), and interface(s) 327 for communicating information (e.g., sending and receiving packets, user-interfaces, displaying information, etc.), which are typically communicatively coupled via one or more communications mechanisms 329, with the communications paths typically tailored to meet the needs of a particular application.

Various embodiments of apparatus 320 may include more or fewer elements. The operation of apparatus 320 is typically controlled by processing element(s) 321 using memory 322 and storage device(s) 323 to perform one or more tasks or processes. Memory 322 is one type of computer-readable/computer-storage medium, and typically comprises random access memory (RAM), read only memory (ROM), flash memory, integrated circuits, and/or other memory components. Memory 322 typically stores computer-executable instructions to be executed by processing element(s) 321 and/or data which is manipulated by processing element(s) 321 for implementing functionality in accordance with an embodiment. Storage device(s) 323 are another type of computer-readable medium, and typically comprise solid state storage media, disk drives, diskettes, networked services, tape drives, and other storage devices. Storage device(s) 323 typically store computer-executable instructions to be executed by processing element(s) 321 and/or data which is manipulated by processing element(s) 321 for implementing functionality in accordance with an embodiment.

FIGS. 4A-4D illustrate the negotiation and assignment of IP subnets and addresses thereon performed in ring network 400 in one embodiment. As shown, packet switching device 410 owns subnet 10.0.0.x (e.g., a /24 subnet) and is seeded with interface 411 as being the owned interface and with interface 412 as being the slave interface. In one embodiment based on this seeding, interface 411 is deterministically determined to have the IP address of 10.0.1.1 as the owned interface is the x.x.x.1 device and the slave interface is the x.x.x.2 device.

Figure 4A:
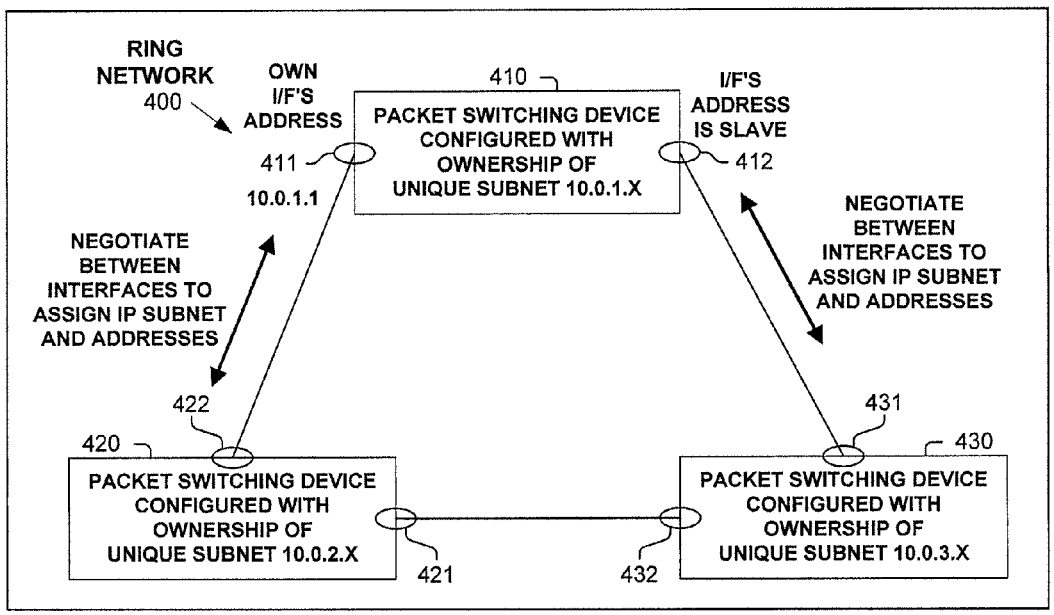
FIGS. 4A-D illustrate a network operating according to one embodiment.
Figure 4B:
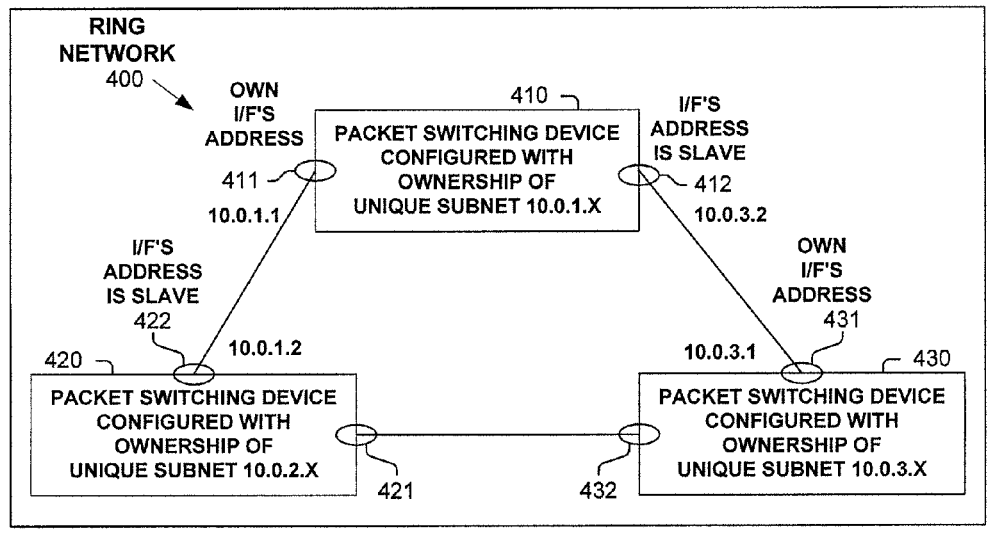
Figure 4C:
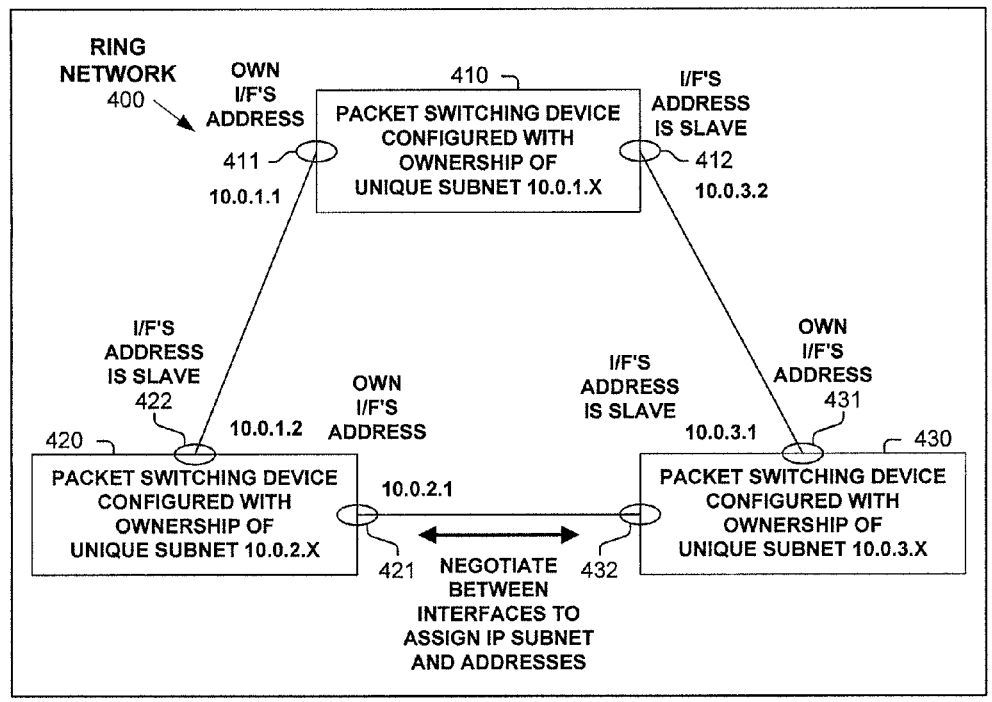
Figure 4D:
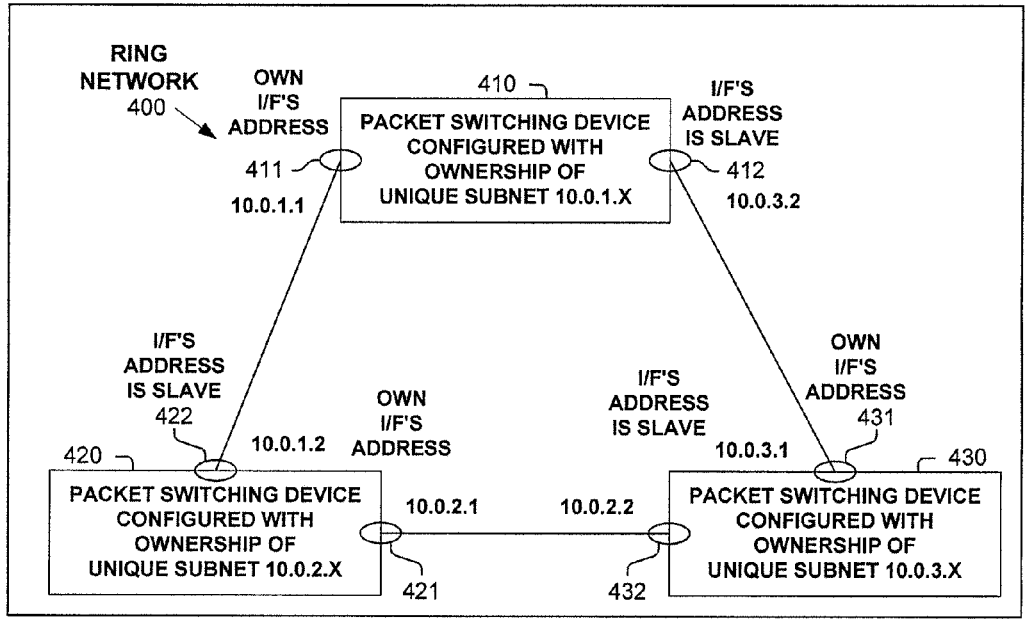

Packet switching device 410 negotiates with each of its adjacent packet switching devices 420 and 430 in determining the automatic assignment of IP addresses in ring network 400. Turning to FIG. 4B, this negotiation results in interface 422 of packet switching device 420 to be a slave interface; hence interface 421 is the owned interface of packet switching device 420. Similarly, this negotiation results in interface 431 of packet switching device 430 to be the owned interface; hence interface 432 is the slave interface of packet switching device 430. In FIG. 4C, packet switching devices 420 and 430 negotiate between them, resulting in the automatic assignment of IP addresses to interfaces 421 and 432 as shown in FIG. 4D. FIG. 4D also shows the IP address assignment to interfaces 411, 412, 421, 422, 431, and 432 of packet switching devices 410, 420, and 430 resulting from the automatic assignment of IP addresses performed in one embodiment.

Figure 5A:
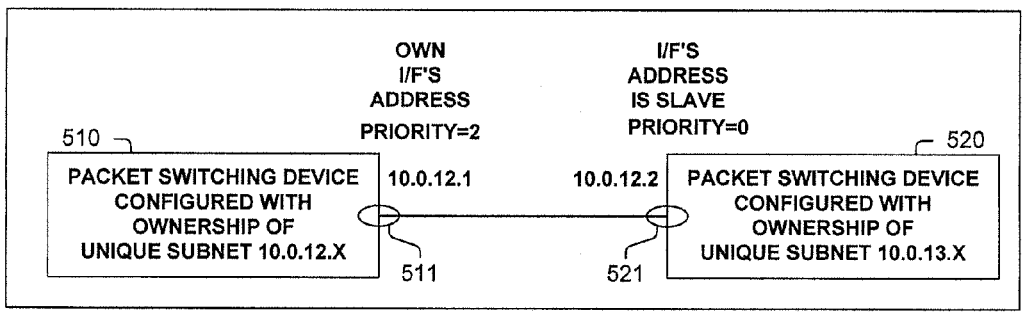
FIGS. 5A-C illustrate a network operating according to one embodiment.
Figure 5B:
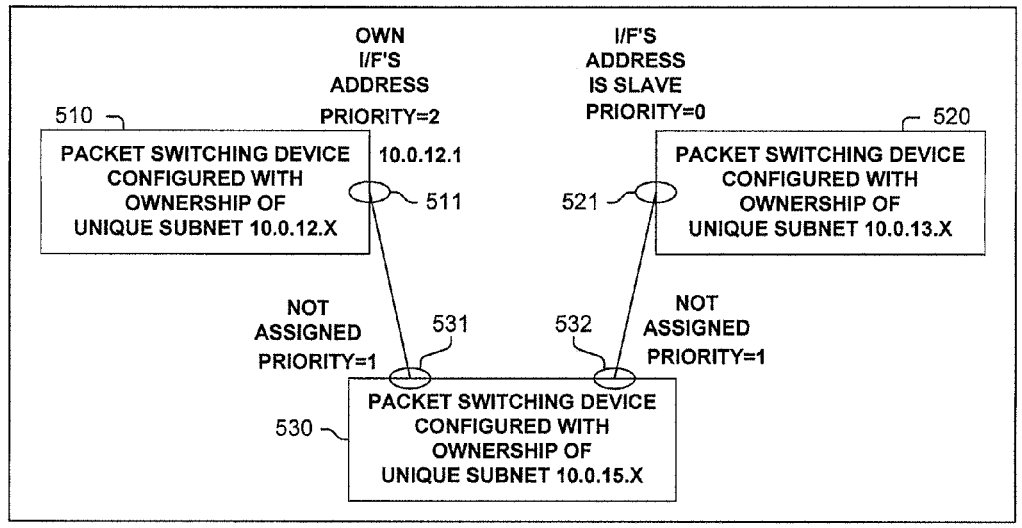
Figure 5C:
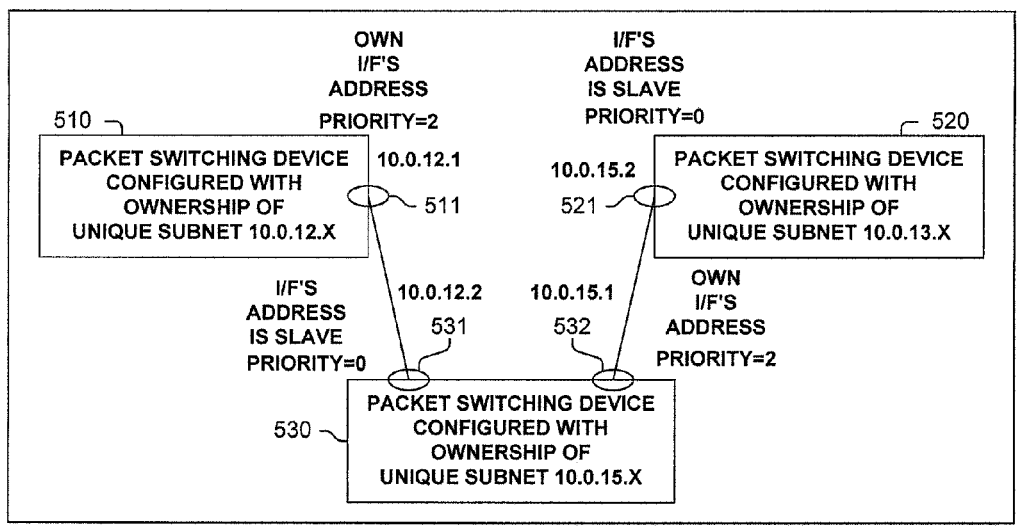

FIGS. 5A-5C illustrate the automatic assignment of IP addresses in a ring network. In one embodiment, the ring network has an open-ring topology. In one embodiment, the ring network is a closed-ring topology. In one embodiment, the ring network is a cascaded-ring topology. FIG. 5A illustrates a configuration in which the IP addresses have already been assigned to interface 511 of packet switching device 510, and to interface 521 of packet switching device 520. As shown, interface 511 is the owned interface of packet switching device 510 and hence has a priority value of two; and interface 521 of packet switching device 520 is the slave interface of packet switching device 520 and hence has a priority value of zero.

As shown in FIG. 5B, packet switching device 530 is inserted in the ring network in between packet switching devices 510 and 520. Each of the two interfaces 531 and 532 of packet switching device 530 initially has the priority value of one (e.g., not known whether it is an owned or slave interface).

FIG. 5C illustrates the resulting automatically assigned IP addresses according to one embodiment. As interface 511 is the owned interface of packet switching device 510, the negotiation informs packet switching device 530 to make interface 531 its slave interface and thus to use the x.x.x.2 address of subnet 10.0.12.0/24. Similarly, as interface 521 is the slave interface of packet switching device 520, the negotiation informs packet switching device 530 to make interface 532 its owned interface and thus to use the x.x.x.1 address of subnet 10.0.15.0/24. This negotiation also informs packet switching device 520 to use the x.x.x.2 address of subnet 10.0.15.0/24.

Also referring to FIGS. 5C and 5A, if packet switching device 530 is removed from the ring network and interfaces 511 and 521 directly connected (e.g., via a point-to-point link), then the configuration of FIG. 5A results from the negotiation (with the priorities shown) as this new link with use the subnet owned by packet switching device 510 based on priorities of interfaces 511 and 521.

Figure 6:
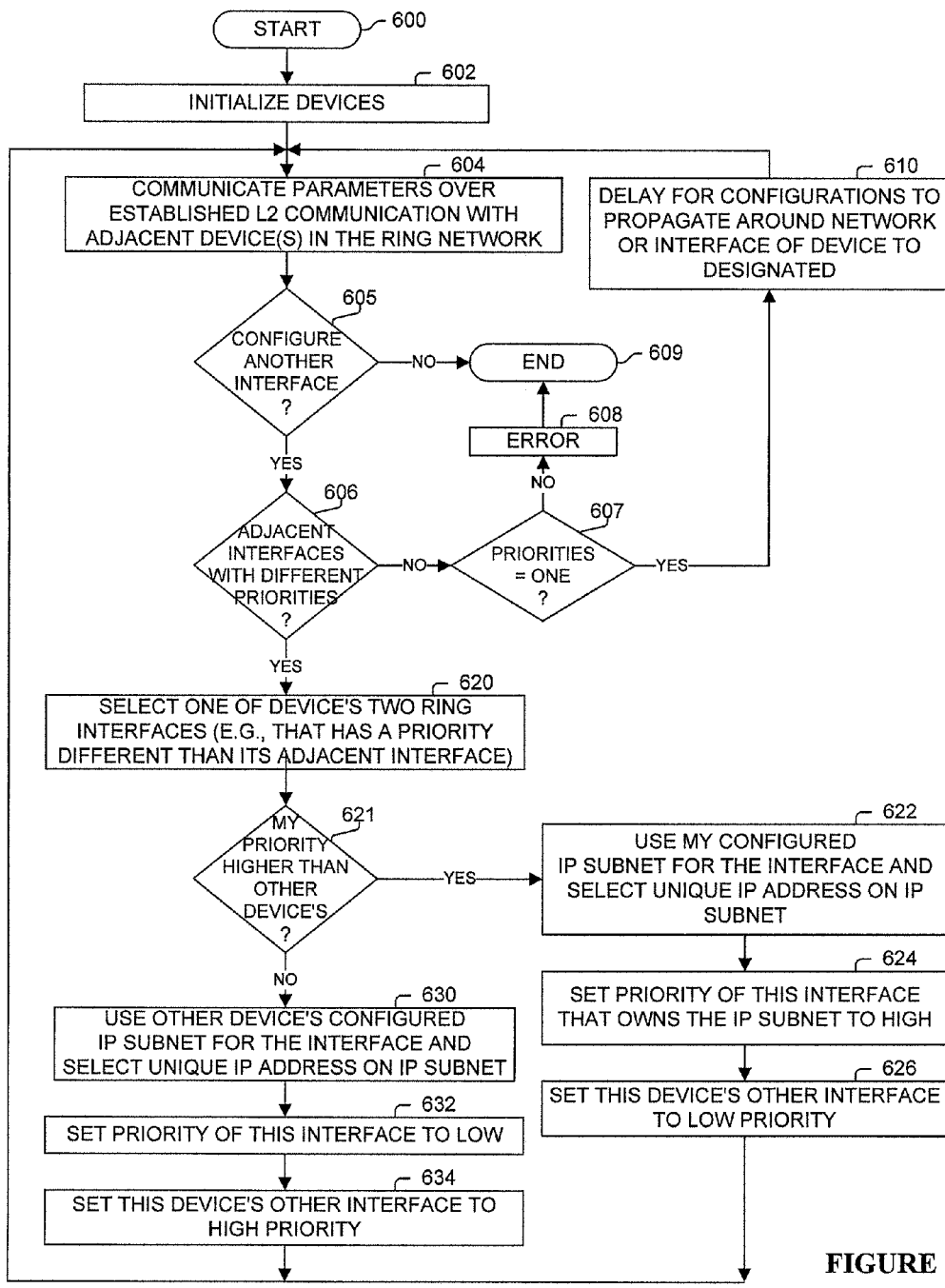
FIG. 6 illustrates a process according to one embodiment.

FIG. 6 illustrates a process performed in one embodiment. Processing begins with process block 600. In process block 602, each of the packet switching devices is initialized with a different IP subnet (e.g., via a local or remote, manual or automated process). Also, in all but one of the packet switching devices, each of its two ring network interfaces is assigned a priority value of one (e.g., state not defined yet as being an owned or slave interface). One of the interfaces of one packet switching device in the ring network is assigned to be the owned interface with a priority of two, with the other ring interface assigned to be the slave interface with a priority of zero. This "seeding" of the ring interface of one embodiment determines the resulting owned and slave interfaces of the other packet switching devices in the network (e.g., the clockwise or counter-clockwise assignment such as described in relation to FIG. 2A).

In process block 604, the parameters (e.g., priority value, owned subnet of sending packet switching device) are communicated over layer 2 established communication with the packet switching device's adjacent device(s) in the network (there will be two, but a communication might not be established or an adjacent device turned on yet).

As determined in process block 605, if both interfaces have been configured, then processing of the flow diagram of FIG. 6 is complete as indicated in process block 609.

Otherwise, processing proceed to process block 606. If the packet switching device determines that the priorities of an interface and the adjacent interface in the ring network have the same value for each of the two interfaces of the packet switching device, then processing proceeds to process block 607. If the priorities are not one (e.g., they are both configured to be owned interfaces or both configured to be slave interfaces), then there is an error (e.g., alarm, notify operator or network management system) as indicated by process block 608, and processing of the flow diagram of FIG. 6 is complete as indicated by process block 609. Otherwise as determined in process block 607, both the priorities were one (e.g., both not assigned to be a slave or to be an owned interface), and processing proceeds to process block 610, wherein a delay is invoked to allow the assignment of owned/slave interfaces to propagate around the network or until one of these interfaces are seeded (e.g., defined) to be an owned or slave interface. Processing then returns to process block 604.

Otherwise in process block 665, it was determined that the exchanged priorities were different and processing proceeds to process block 620. The packet switching device selects one of the two interfaces that it has yet to configure (e.g., one that had a different priority than its adjacent interface in the ring network as this will determine the designation of owned and slave interfaces of the packet switching device).

As determined in process block 621, if the priority of the interface of the packet switching device is greater than that of its adjacent neighboring interface, then in process block 622, this is the owned interface and the packet switching device uses its configured IP subnet for this interface and will select a unique address on this subnet to use. Typically, this unique address is deterministically determined based on whether the interface is the owned or slave interface. In process block 624, the priority of this interface is set to high (e.g., two) as it is the owned interface. In process block 626, the packet switching device's other interface on the ring interface is the slave interface and its priority is set to low priority (e.g., zero). Processing returns to process block 604 to communicate the configured parameters to the adjacent interface.

Otherwise, as determined in process block 621, the priority of the interface of the packet switching device is less than that of its adjacent neighboring interface and this selected interface is the slave interface. In process block 630, the packet switching device uses the configured IP subnet of its adjacent neighboring packet switching device, and will select a unique address on this subnet to use. Typically, this unique address is deterministically determined based on whether the interface is the owned or slave interface. In process block 632, the priority of this interface is set to low (e.g., zero) as it is the slave interface. In process block 634, the packet switching device's other interface on the ring interface is the owned interface and its priority is set to high priority (e.g., two). Processing returns to process block 604 to communicate the configured parameters to the adjacent interface.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    performing operations in a ring network of a plurality of packet switching devices forming a closed-ring topology ring network, with the plurality of packet switching devices including at least three packet switching devices, with each of the plurality of packet switching devices having two different adjacent packet switching devices in the ring network, with each of the plurality of packet switching devices including a first ring network interface used to communicate with a first one of said two different adjacent packet switching devices and includes a second ring network interface for communicating with the non-first one of said two different adjacent packet switching devices, with each particular packet switching device of the plurality of packet switching devices assigned a particular Internet Protocol (IP) subnet to be used in communicating with one of said two different adjacent packet switching devices of said particular packet switching device; and wherein said operations include:
    negotiating, including communicating between each adjacent pair of the plurality of packet switching devices in the ring network, to determine the use of said assigned IP subnets between adjacent pairs of packet switching devices of the plurality of packet switching devices in the ring network such that each of said assigned IP subnets is used in communicating between packet switching devices of one of said adjacent pairs of packet switching devices, which includes for each adjacent pair of the plurality of packet switching devices in the ring network: assigning a first IP address of the corresponding said assigned IP subnet to the first ring network interface of a first packet switching device of said adjacent pair and assigning a second IP address of the corresponding said assigned IP subnet to the second ring network interface of a second packet switching device of said adjacent pair; and
    communicating packets by each of the plurality of packet switching devices with each of its said two different adjacent packet switching devices respectively using IP addresses of said determined IP subnets said assigned to the first and second interfaces of each of the plurality of packet switching devices.

2. The method of claim 1, wherein each of the plurality of packet switching devices is associated with a current priority which is used in said determining the use of said assigned IP subnets between adjacent pairs of packet switching devices of the plurality of packet switching devices.

3. The method of claim 1, comprising receiving said initially assigned IP subnet from an operator interface by each of the plurality of packet switching devices.

4. The method of claim 1, comprising receiving said initially assigned IP subnet by each of the plurality of packet switching devices from an external device.

5. The method of claim 2, wherein said determining the use of said IP subnets includes for a particular adjacent pair of packet switching devices in the ring network includes determining which of the two assigned different IP subnets to the packet switching devices of the particular adjacent pair of packet switching devices to use for the IP subnet between the particular adjacent pair of packet switching devices is determined based on the relative priority of the two current priority values assigned to the packet switching devices of the particular adjacent pair of packet switching devices.

6. The method of claim 5, wherein said determining which of the two assigned different IP subnets to the packet switching devices of the particular adjacent pair of packet switching devices to use for the IP subnet between the particular adjacent pair of packet switching devices includes communicating from each particular packet switching device to the other packet switching device of the particular adjacent pair the different IP subnet and the current priority value of said particular packet switching device.

7. The method of claim 5, wherein said determining which of the two assigned different IP subnets to the packet switching devices of the particular adjacent pair of packet switching devices to use for the IP subnet between the particular adjacent pair of packet switching devices includes communicating from each particular packet switching device to the other packet switching device of the particular adjacent pair the different IP subnet of said particular packet switching device.

8. The method of claim 1, wherein each said adjacent pair of the plurality of packet switching devices in the ring network communicates over a point-to-point link; and wherein each of the IP subnets use thirty-one bit prefixes.

9. A particular packet switching device, comprising:

one or more processing elements;

memory;

a first interface configured to communicate packets with a first adjacent node in a ring network have a closed-ring topology, including communicating first Internet Protocol (IP) subnet negotiation information; and a second interface configured to communicate packets with a second adjacent node in the ring network, including communicating second IP subnet negotiation information;

wherein each of the particular packet switching device, the first adjacent node, and the second adjacent node is assigned a different Internet Protocol (IP) subnet to be used in communicating with one of its adjacent nodes in the ring network, with the particular packet switching device assigned a particular IP subnet of the different IP subnets, the first adjacent node assigned a first IP subnet of the different IP subnets, and the second adjacent node assigned a second IP subnet of the different IP subnets;

wherein the particular packet switching device is configured to perform operations, including:

negotiating with each of the first and second adjacent nodes to determine to use the particular IP subnet in communicating between the particular packet switching device and the second adjacent node, and to use the first IP subnet in communicating between the particular packet switching device and the first adjacent node;

in response to said negotiating: assigning the first interface a first IP address of the first IP subnet and assigning the second interface a second IP address of the particular IP subnet, and with an interface of the first adjacent node being assigned a first different IP address of the first IP subnet and with an interface of the second adjacent node being assigned a second different IP address of the particular IP subnet;

communicating packets with the first adjacent node using the first IP address and the first different IP address, both of the first IP subnet; and communicating packets with the second adjacent node using the second IP address and the second different IP address, both of the particular IP subnet.

\* \* \* \* \*